April 29, 1958   E. M. STEVENS ET AL   2,832,481
TRANSPORT CONTAINER CRAWLER
Filed Feb. 8, 1955   3 Sheets-Sheet 1
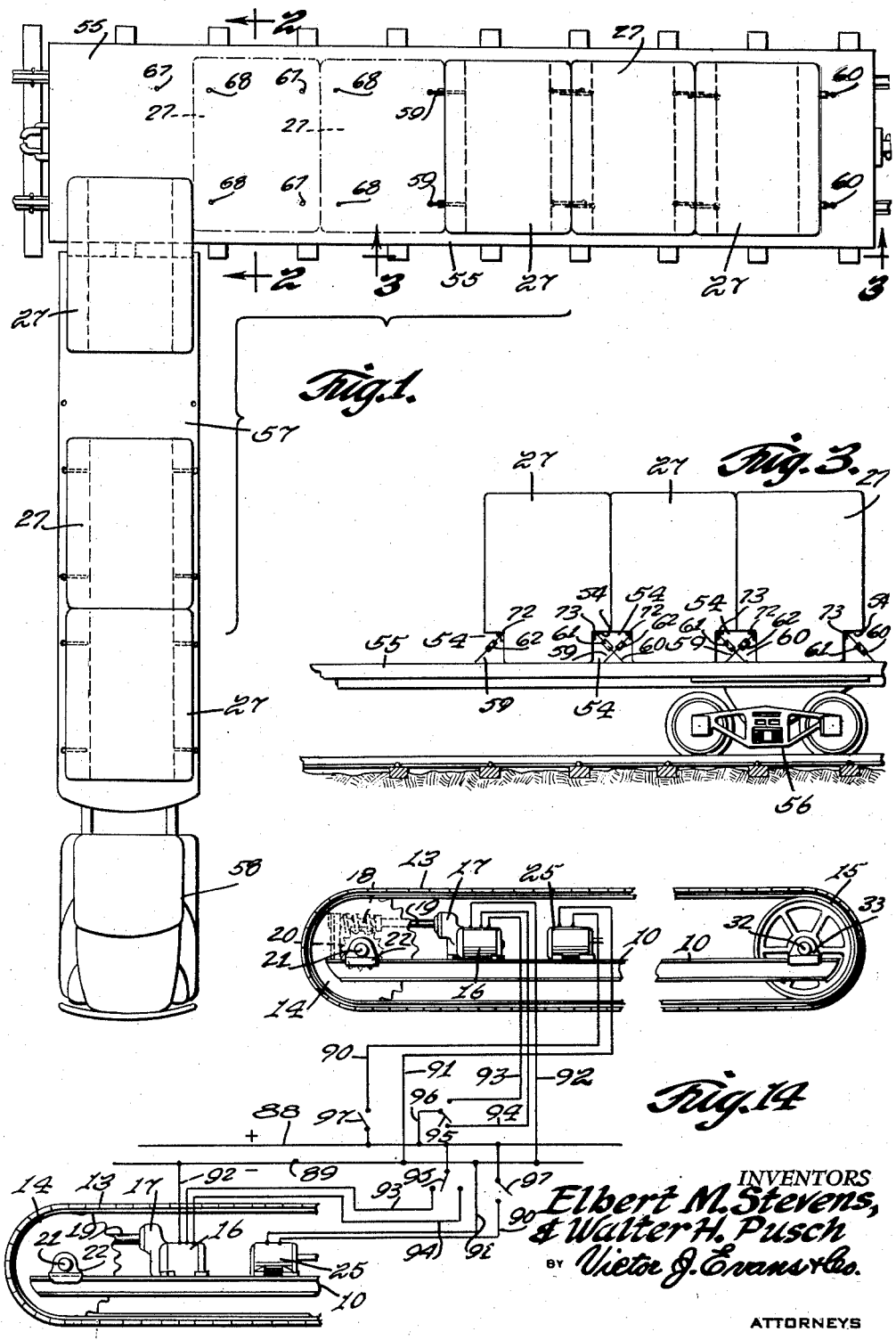

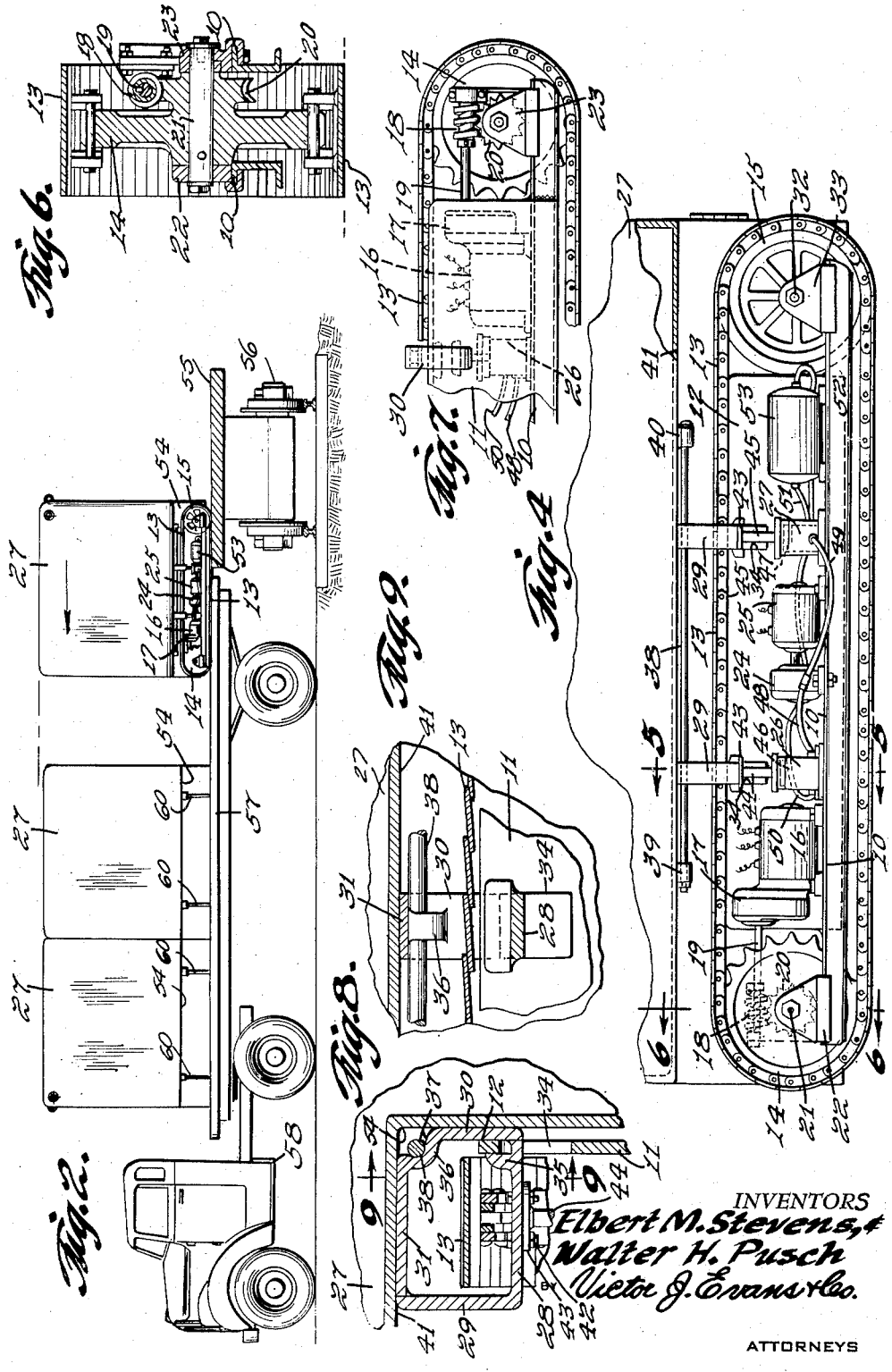

April 29, 1958
E. M. STEVENS ET AL
2,832,481
TRANSPORT CONTAINER CRAWLER
Filed Feb. 8, 1955
3 Sheets-Sheet 3
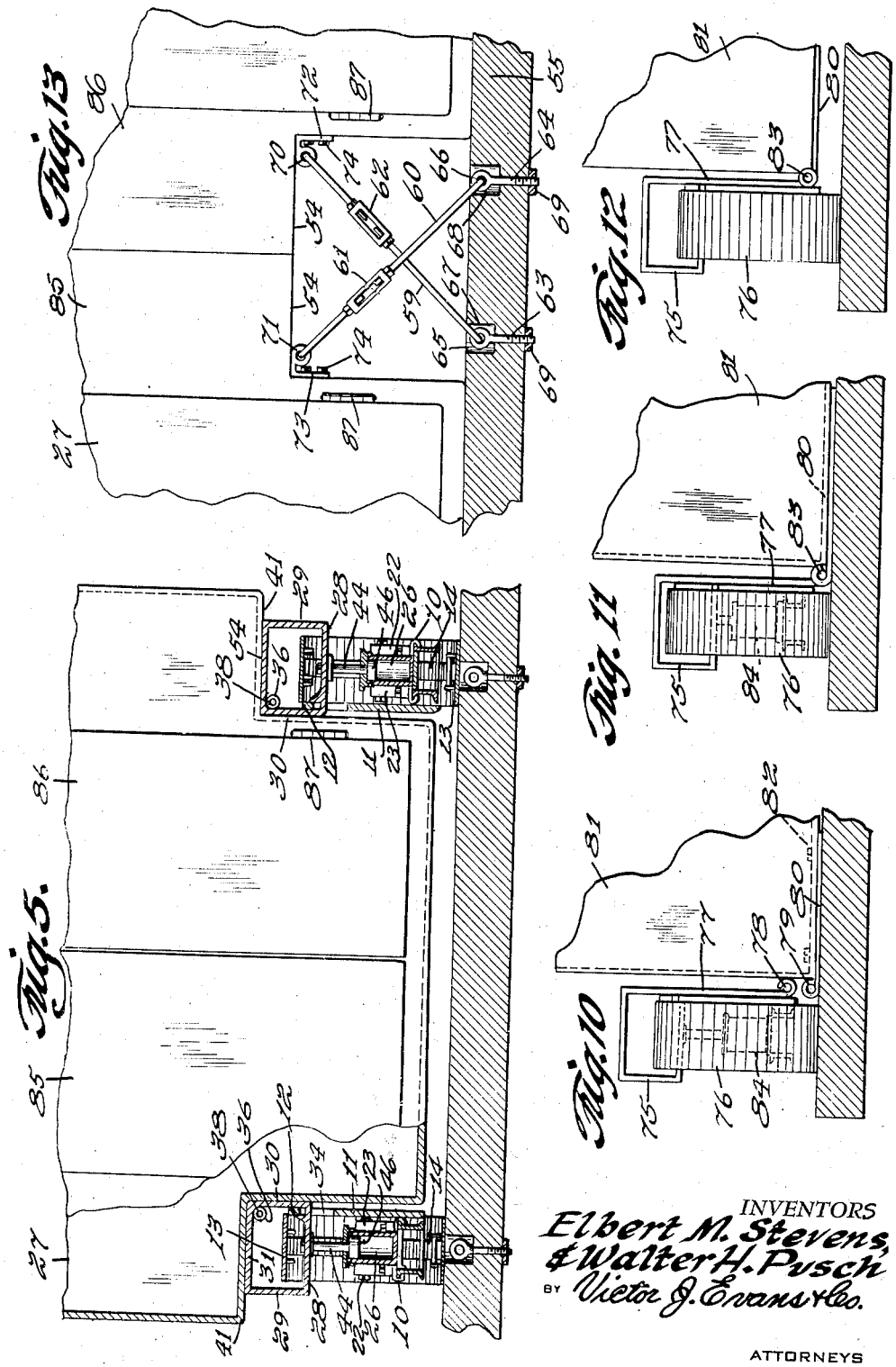
INVENTORS
Elbert M. Stevens,
& Walter H. Pusch
BY Victor J. Evans & Co.
ATTORNEYS United States Patent Office 2,832,481
Patented Apr. 29, 1958

2,832,481

TRANSPORT CONTAINER CRAWLER

Elbert M. Stevens and Walter H. Pusch, San Antonio, Tex.

Application February 8, 1955, Serial No. 486,836

1 Claim. (Cl. 214—38)

This invention relates to transportation or to cargo handling and shipping, and particularly to transshipment or transfer of shipping units from one means of transportation to another, as where railways and motor transport are used consecutively in any one transport trip; and the invention relates particularly to the transfer movement of large unitized loads, such as those packed in large transport containers or bound to pallets or skids, intact as a unit, without requiring the piecemeal handling of cargo in unloading and reloading, and in transferring as a unit from place of loading to loading dock, or from dock to truck or truck-trailer, and from thence to railroad car, from rail car again to truck or other mode of transport, thence even conceivably to freight elevator, and thence to most convenient inside unloading point. The invention also relates to a means of effecting such transfer by means of readily affixed and removed powered and controlled raising-and-moving mechanisms; and it also relates to minor adaptations in transport containers or skids which would be better adapted to movement with such a device and to tie-down and low-center-of-gravity riding qualities than are more conventional transport units.

The purpose of this invention is to provide a self-contained jack and mover adapted to be attached temporarily to in-transit goods holders, whereby the goods holders may readily be moved from storage to transportation means and thence to further transportation means as a unit and without unloading the component transported goods separately.

The economic purpose of this invention is to provide a flexible, simple, and inexpensive means of cutting the cost of moving goods from one mode of transport to another; for it is well known that, while railroads are the most economical form of land transport, the point of shipment and the point of delivery of goods are frequently far from the railhead, and the costs of transferring goods from other modes of transport to the railroad and again from the railroad to other modes of transport for delivery are frequently so inordinately high as to offset entirely any transport savings of rail shipment, to the point where it is frequently more economical at present to ship goods an entire distance by other less economical transport means because the avoidance of transfer much more than offsets the increased ton-mile cost. In recognition of these facts, a number of systems have been devised to place a loaded truck-trailer upon a railroad flat car, then to remove it at destination railhead, there attaching a truck-tractor to move the loaded trailer to destination. But such transportation of an entire trailer has a number of offsetting disadvantages: it substantially doubles the load per unit of live cargo; the shipment as dead weight of expensive non-utilized rolling stock is uneconomic; trailers themselves are of such length that they do not fit economically on standard railroad cars and must therefore be shipped, for efficiency, on special-length cars (which, with extra-length cars, could also result in requiring rebuilding of certain road-bed curves to make passage possible); the rolling unit of trailers results in live-cargo bed being roundly four feet higher than the railway car bed, which in turn results in a delicately high center of gravity and in some clearance difficulties, which trailer "piggy-back" advocates have in turn attempted to solve with specially built low-bed underslung railroad cars and other expensive expedients; and yet a further difficulty remains to these trailer piggy-back advocates, that of placing the trailer upon the flat car and again removing it, in which problem they have utilized immense fork-lift vehicles which are too expensive and require too much maneuvering space to be used in other than specially designated major terminals. Thus, until the invention here presented, expedients to attempt to circumvent the high cost of moving goods from one mode of transport to another have themselves been so expensive as to be of limited economic feasibility.

The object of this invention is, therefore, to provide a device which can be "walked" on its own power to and under a skid or goods container, can then raise or jack the skid or container for clearance, and, temporarily affixed to the skid or container, can "walk" the load a short transfer distance, as from one mode of transport to another, and, thereupon lowering the load, be readily disengaged to "walk" out away from the load and thus be repeatedly used; and modifications of skid or container and of transport bed as will facilitate the most efficient use of such device in effecting transfers and as will facilitate low-gravity-center and tie-down for better "riding" of the load when the transport is moving.

It is thus an object of the invention to provide a crawler having an endless chain of the crawler type as the preferred form, such form best being able to traverse differences in bed height from one mode of transport to another, although use of wheel or roller rather than tread is not precluded.

It is thus another object of the invention to provide means for affixing to the skid or goods container, means of raising the skid of goods container, means of powering movement of affixed unit and of the skid or goods container thereto affixed, and means of controlling at a convenient distance a pair of such moving units as it is intended that, for flexibility and ease of affixing and removal, and for simultaneously furnishing a wide "wheelbase" of great stability in moving, that moving units be utilized in pairs.

With these and other objects and advantages in view, the invention in its preferred form embodies a crawler having an endless track trained over sprockets at the ends with a driving motor mounted on a platform suspended between the sprockets and geared to a sprocket at one end of the crawler; having also on the platform hydraulic jacks for elevating the skid, transport container or goods container; having also a compressor for supplying fluid, or which has air, which has shock-adjusting resilience to the jacks; and having also a reservoir for storing the fluid or, alternatively, having mechanical types of jacks.

Other features and advantages of the invention will appear from the following description, taken in connection with the accompanying drawings, wherein:

Figure 1 is a plan view illustrating the use of the crawler showing transport containers being transferred from a flat car to the platform of a trailer.

Figure 2 is a sectional view taken on line 2—2 of Figure 1 showing the trailer in elevation and also showing a transport container traveling from a flat car to a trailer.

Figure 3 is a side elevational view taken on line 3—3 of Figure 1 showing a plurality of transport containers anchored to the platform of a flat car, one end of the flat car being broken away.

Figure 4 is a side elevational view showing an assembly of the crawler and also showing the crawler in the position of elevating a transport container to facilitate connecting the container to the crawler with pins, bolts, and the like.

Figure 5 is a cross section taken on line 5—5 of Figure 4 showing a pair of crawlers supporting a transport container with the container elevated for carrying from a flat car to a trailer or from a trailer to a flat car.

Figure 6 is a cross section taken on line 6—6 of Figure 4 with the parts shown on an enlarged scale showing one of the sprockets over which the crawler track is trained, the sprocket being provided with driving means.

Figure 7 is a side elevational view of the end of the crawler shown in Figure 6 showing the worm gear actuated by a motor for driving the crawler.

Figure 8 is a cross section taken on line 5—5 of Figure 4, with the parts shown on an enlarged scale illustrating the mounting of the yokes of the hydraulic jacks.

Figure 9 is a longitudinal section taken on line 9—9 of Figure 8 also showing the upper portion of one of the yokes for connecting the hydraulic jacks to a container.

Figure 10 is an end elevational view illustrating a modification wherein the crawler is adapted to be connected to a transport container of the conventional rectangular-shaped box type.

Figure 11 is a view similar to that shown in Figure 10 showing the mounting means of the crawler lowered to such a position that the container is adapted to be connected thereto.

Figure 12 is a view similar to that shown in Figures 10 and 11 showing the container elevated for transportation.

Figure 13 is a side elevational view with the parts shown on an enlarged scale illustrating means for anchoring the transport containers to the platform of a flat car.

Figure 14 is a diagrammatic view illustrating the power or driving element of a crawler showing the motors connected to a source of electric current with a wiring diagram in which the connections are provided.

Although the diagrammatic view and wiring diagram shown in Figure 14 show the use of electric motors, it will be understood that both the elevating jacks and driving unit may be operated by other power means, such as air motors, as used in industrial drills, air hammers, and the like, gasoline engines, or small electric or gasoline powered air compressors which may be comparatively small as the power element continues working between movements of the crawlers and between operations of the jacks.

Referring now to the drawings, wherein like reference characters denote corresponding parts, the preferred form of the transport container crawler of this invention includes an elongated mounting channel having a lower flange providing a platform 10 and a vertically disposed web or plate 11 with an open upper edge 12, an endless chain 13 trained over a driving sprocket 14 at one end and an idler sprocket 15 at the opposite end, a motor 16 operatively connected to the driving sprocket 14 through a gear reduction 17, a worm 18 on a shaft 19 extended from the gear reduction and meshing with a worm gear 20 mounted with the sprocket 14 on a shaft 21 which is rotatably mounted with bearings 22 and 23 on the platform 10, a compressor 24 actuated by a motor 25 and connected by suitable conduits to hydraulic jacks 26 which are adapted to elevate transport containers 27 through rectangular-shaped yokes, each having a horizontal bar or base 28, end bars 29 and 30, and an upper horizontal plate 31, and a reservoir which, with the jacks, motors and compressor is mounted on the platform 10.

The idler sprocket 15, at the end of the crawler opposite to that in which the driving sprocket 14 is positioned, is rotatably mounted by a shaft 32 in bearings 33 on the platform 10 and the bearings are adapted to be moved longitudinally on the platform to take up slack in the endless caterpillar tread or chain 13.

The yokes of the hydraulic jacks are positioned, as shown in Figures 4, 5, 8, and 9, around the upper section of the caterpiller tread or chain and the end bars or vertical risers 30 proceed upward past the open top edge 12 of the frame, past the caterpillar tread and is affixed solidly, as by welding, to the top plate 31. The lower horizontal portion or base 28 of each yoke proceeds horizontally through a slot 34 in the web 11 of the side channel, and is then affixed, as by welding, to the vertically disposed end bar or leg 29 of the yoke, the bar 29 being integral with the top plate 31.

A protuberance 35 extended upwardly from the base 28 of each yoke, immediately preceding the portion entering the slot 34 in the web 11 counteracts one direction of side thrust; the juxtaposition of leg or bar 30 and the vertical web 11 of the mounting channel, the one sliding upon the other vertically but restrained from side movement, counteracts the other side-thrust.

The upper inner corners of the yokes are provided with offset sections 36 providing openings or eyes 37 through which a rod 38, mounted in eyes 39 and 40 on a ledge 41 of a container 27 extends.

The horizontally disposed base 28 of each yoke is secured by bolts 42 on a flange 43 of the piston rods 44 and 45 which extend from pistons 46 and 47 in the hydraulic jacks 26 and 27.

By this means fluid under pressure from the compressor 24 and connected to the lower ends of the cylinders with tubes 48 and 49 drives the pistons and yokes upwardly whereby a transport container is elevated from a stationary position upon a base or platform to a position for traveling, such as shown in Figures 4 and 5. The opposite sides of the cylinders and return of the compressor are connected by tubes 50, 51 and 52 to the storage tank 53.

With the parts as illustrated in Figures 1 to 5, inclusive, the transport containers 28 are formed with notches or recesses 54 which extend longitudinally in lower corners thereof and with the containers positioned on a platform 55 of a flat car having trucks 56 a pair of crawlers is run from a trailer platform into the recesses 53 and 54 with the yokes 29 and 30 and L-shaped member carried thereby in lower positions and with the crawlers in position, such as shown in Figure 2, the motors 16 are operated and as the driving sprockets 14 rotate the crawlers crawl across the platform 55 of the flat car assuming positions in the recesses. With the crawlers in the recesses, the motors 25 are started whereby pressure is supplied to the cylinders 26 and 27, the pressure causing the pistons and yokes to travel upwardly elevating the container to the position shown in Figures 4 and 5. With the container elevated, the motors 16 are again started and the crawlers carry the transport containers from the platform of the flat car to a platform 57 of a trailer 58.

With the container arriving at a position nested against the ends of the trailer body or against another container on the platform thereof, circuits to the motors are broken, pressure to the cylinders 26 and 27 relieved, and the container is deposited upon the platform.

The motors 16 are then reversed whereby the crawlers travel toward the platform of the flat car and with the trailer advanced to the position of the next container the crawlers travel into the recess 54 of the container. The cycle of operations is then repeated.

For transportation the transport containers are anchored to the platform 55 of the flat car with rods 59 and 60 having turnbuckles 61 and 62 therein, respectively, and, as illustrated in Figure 11, the rods are anchored with eye bolts 63 and 64, eyes 65 and 66 thereof being positioned in recesses 67 and 68 in the upper surface of the platform 55 and eyes on the ends of the rods 59 and 60 are extended through the eyes 65 and 66. The eye bolts 63 and 64 are secured in position in the platform 55 with nuts 69 that are threaded on lower ends thereof.

The upper ends of the rods 59 and 60 are secured in eyes 70 and 71 of brackets 72 and 73 which are secured by bolts 74 in upper inner corners of the recess 54. By this means the containers are definitely anchored to the platform of the flat car and longitudinal movement of the containers on the platform is prevented.

It will be understood that the crawlers may be used with transport containers of different sizes and designs, and where it is desired to use the crawlers with conventional rectangular shaped transport containers, yokes 75 of crawlers 76, similar to the yokes shown in Fig. 8, are provided with depending legs 77 with eyes 78 in lower ends thereof, and the eyes 78 are positioned to register with eyes 79 at the ends of brackets 80 that may be secured to lower surfaces of containers 81 with bolts 82. With the yokes in lower positions, as shown in Figure 11, pins 83 extended through the eyes connect the yokes to the containers.

The crawlers 76, of the type illustrated in Figures 10, 11 and 12, are provided with fluid pressure cylinders 84, as shown in dotted lines, and these cylinders are mounted and actuated, similar to the cylinders 26 and 27 of the crawlers shown in Figure 4.

It will also be understood that the yokes and bearing plates may be provided in other designs to provide means for attaching the crawlers to, or having them bear against for raising and carrying, the transport containers or shipping boxes or skids of different types and designs.

The containers may be completely enclosed or sealed, or the ends may be provided with doors, as indicated by the numerals 85 and 86 in Figure 5, and the doors may be supported with hinges as indicated by the numeral 87.

With the parts actuated by electric motors, current may be supplied with circuits, as illustrated in Figure 4, wherein supply wires 88 and 89 are connected with wires 90 and 91 to the motors 25 for actuating the elevating jacks and the motor 16 is connected by a wire 92 to the wire 89 and by wires 93 and 94 to terminals of a switch having a contact arm 95. The arm 95 is connected by a wire 96 to the wire 88, the switch providing means for changing the current in the field winding of the motor to reverse the direction of rotation of the motor. The wire 90 of the motor 25 is also provided with a switch, as indicated by the numeral 97, and the device may include a rheostat in an electric system, or a system of valves in a hydraulic or pneumatic system, whereby the speed of the conveyors or parts thereof may be controlled. It will be understood, however, that the parts may be actuated by air motors, small gasoline engines, or other power units.

It will also be understood that the circuits may be duplicated as shown in the lower part of Figure 14, so that the crawlers on both sides of a container may be actuated simultaneously.

It will be understood that other modifications, within the scope of the appended claim, may be made in the design and arrangement of the parts without departing from the spirit of the invention.

What is claimed is:

In a crawler for use in moving transport containers, the combination which comprises an elongated horizontally disposed platform, a driving sprocket rotatably mounted on one end of the platform, an idler sprocket rotatably mounted on the opposite end of the platform, an endless crawler track trained over said sprockets, power means mounted on the platform and operatively connected to the driving sprocket, hydraulic jacks mounted on the platform, means for supplying fluid under pressure to said hydraulic jacks, yokes carried by the hydraulic jacks and positioned to extend around the upper section of the crawler track, said yokes having eyes therein, eyes positioned on a container and adapted to register with the eyes of the yokes, and rods extending through the eyes of the container and eyes of the yokes for connecting the crawler to a transport container, a pair of said crawlers being adapted to be positioned in longitudinally disposed recesses in lower corners at the sides of a transport container.

References Cited in the file of this patent

UNITED STATES PATENTS

| 1,067,625 | Smith | July 15, 1913 |
| 2,070,793 | Kent | Feb. 16, 1937 |
| 2,138,485 | Faries | Nov. 29, 1938 |
| 2,626,065 | Sanders et al. | Jan. 20, 1953 |

FOREIGN PATENTS

| 623,360 | Germany | Dec. 19, 1935 |